J. SMITH.
Corn-Cultivator.

No. 202,763. Patented April 23, 1878.

Witnesses: Inventor:

UNITED STATES PATENT OFFICE.

JOSIAH SMITH, OF OSWEGO, ILLINOIS.

IMPROVEMENT IN CORN-CULTIVATORS.

Specification forming part of Letters Patent No. 202,763, dated April 23, 1878; application filed February 11, 1878.

*To all whom it may concern:*

Be it known that I, JOSIAH SMITH, of Oswego, in the county of Kendall and State of Illinois, have invented certain new and useful Improvements in Corn-Cultivators; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1:
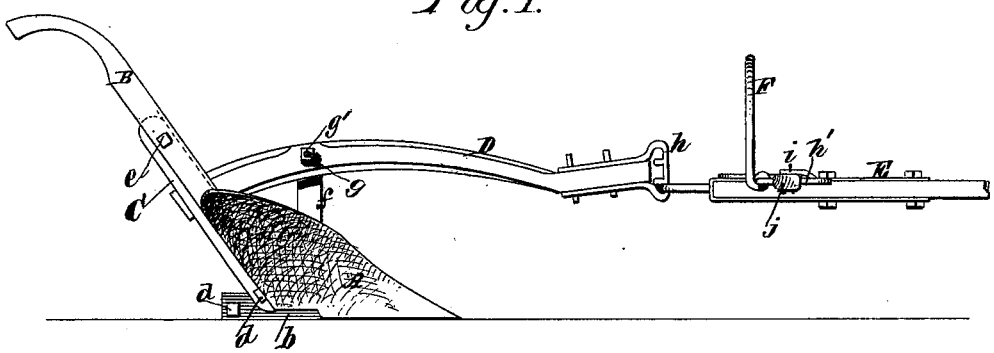
Figure 2:
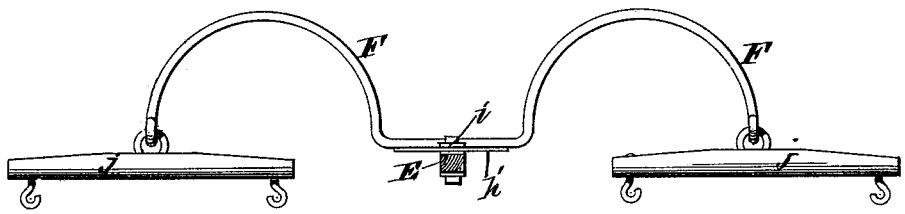
Figures 3, 4:
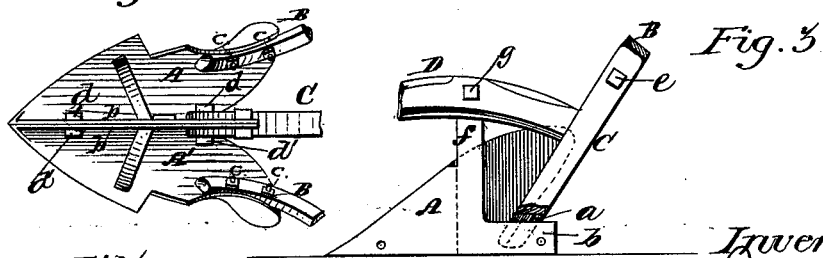

Figure 1 is a side view of my improved corn cultivator or plow. Fig. 2 is a front view of the same. Fig. 3 is a view showing one of the plows detached; and Fig. 4 is an inverted view of my plow.

Corresponding parts in the several figures are denoted by like letters.

This invention appertains to certain improvements in corn-cultivators; and it consists in the union of a right and left plow, detachably connected to a pair of handles, and in the employment of a double-bowed evener or whiffletree in connection with certain other devices, substantially as hereinafter more fully set forth.

In the annexed drawing, A A' refer to the union of two plows, with their land-sides brought together and adjusted to a pair of handles, B B, so that either one can be removed and the plow converted into a right or left plow. This is obvious from the following: Each plow or share A A' is provided with a plate or bar, $b\ b$, having apertures, through which are passed headed screw-bolts $d\ d$, nutted as at $d'\ d'$, when the two are united, and by which they can be readily separated one from the other by simply removing the nuts $d'\ d'$, after which the said bolts may be withdrawn.

The handles B B and the central standard C are also detachably connected to the plows, the former as shown at $c\ c$, and the latter by being slotted, as at $a$, and by means of screw-bolts and nuts. The handles B B are not affected by the removal of either one of the plows, and consequently can both be used with one or both of the plows, the handle from which its plow or share is detached being firmly bolted and connected to the central upright C, and the opposite handle by means of the bar $e$.

The connections $f\ f$ between the plows or shares A A' and the beam D are rendered detachable from the latter by headed screw-bolt $g$, nutted as at $g'$.

A horizontally-curved metallic or other bar, $e$, unites the handles together and to the central upright C, and braces the handles in position. The two uprights $f\ f$ of the plows, which secure the latter to the beam D, are detachably connected thereto by screw-bolts and nuts $g\ g'$.

The forward end of the plow-beam D is provided with a clevis, $h$, for the attachment thereto of the tongue E. Upon the tongue E is mounted a double-bowed whiffletree or equalizer, F, by means of a plate or disk, $h'$, pivoted to the tongue, and having a limited horizontal movement in the arc of a circle under a flange or extension, $i$, also fastened to the tongue. This movement permits the equalizer to yield to the constantly-changing draft of the team, and at the same time its appendages are prevented from coming in contact with the tongue.

The object of the bows of the equalizer is to free it from contact with the growing corn while the same is being cultivated.

The appendages of the equalizer F are the whiffletrees $j\ j$, for hitching the team to the plow or cultivator.

Having thus described my invention, what I claim, and desire to secure by Letters Patent, is—

1. In a corn cultivator or plow, the union of the right and left plows A A', provided with the perforated bars or plates $b\ b$, detachably connected together by headed screw-bolts $d\ d$ and nuts $d'\ d'$, with the pair of handles B B and the slotted central upright C, all detachably secured to the plows A A', substantially as shown and described, and for the purpose set forth.

2. The double-bowed equalizer F and disk or plate $h'$, pivoted to and in combination with the tongue of the cultivator or plow, and confined under the flange or plate $i$, and possessing a limited horizontal movement in the arc of a circle, substantially as and for the purpose specified.

In testimony that I claim the foregoing as my own I hereto affix my signature in presence of two witnesses.

JOSIAH SMITH.

Witnesses:
H. S. HUDSON,
JEREMIAH EVARTS.